United States Patent
Sakai

(10) Patent No.: US 9,582,914 B2
(45) Date of Patent: Feb. 28, 2017

(54) APPARATUS, METHOD AND PROGRAM FOR CUTTING OUT A PART OF AN IMAGE

(71) Applicant: SONY CORPORATION, Tokyo (JP)

(72) Inventor: Yusuke Sakai, Kanagawa (JP)

(73) Assignee: SONY CORPORATION, Tokyo (JP)

(*) Notice: Subject to any disclaimer, the term of this patent is extended or adjusted under 35 U.S.C. 154(b) by 238 days.

(21) Appl. No.: 14/248,901

(22) Filed: Apr. 9, 2014

(65) Prior Publication Data

US 2014/0320525 A1    Oct. 30, 2014

(30) Foreign Application Priority Data

Apr. 30, 2013    (JP) ................................. 2013-095886

(51) Int. Cl.
| | |
|---|---|
| *G06F 3/0484* | (2013.01) |
| *G06T 11/60* | (2006.01) |
| *G06T 11/00* | (2006.01) |
| *G06F 3/0488* | (2013.01) |

(52) U.S. Cl.
CPC ............. *G06T 11/60* (2013.01); *G06F 3/0488* (2013.01); *G06F 3/04845* (2013.01); *G06F 3/04847* (2013.01); *G06T 11/00* (2013.01); *G06T 2210/22* (2013.01)

(58) Field of Classification Search
CPC .... G06F 3/04845; G06F 3/0488; G06F 3/048; G06T 11/60; H04N 1/00167
See application file for complete search history.

(56) References Cited

U.S. PATENT DOCUMENTS

| | | | |
|---|---|---|---|
| 2009/0080801 A1* | 3/2009 | Hatfield | G06T 11/60 382/283 |
| 2012/0162103 A1* | 6/2012 | Kobayashi | G06F 3/04815 345/173 |
| 2012/0176401 A1* | 7/2012 | Hayward | H04N 5/23216 345/619 |

FOREIGN PATENT DOCUMENTS

JP    2007-281650 A    10/2007

* cited by examiner

*Primary Examiner* — Jacinta M Crawford
*Assistant Examiner* — Diane Wills
(74) *Attorney, Agent, or Firm* — Chip Law Group

(57) ABSTRACT

Provided is an image processing apparatus including: a cutout frame setting section configured to set a cutout frame for partially cutting out an editing target image as an editing target; an image editing section configured to edit, in response to an instruction from a user, an image in the cutout frame superimposed on the editing target image; and a cutout image generation section configured to cut out the image in the cutout frame from the editing target image and generate a cutout image.

17 Claims, 17 Drawing Sheets

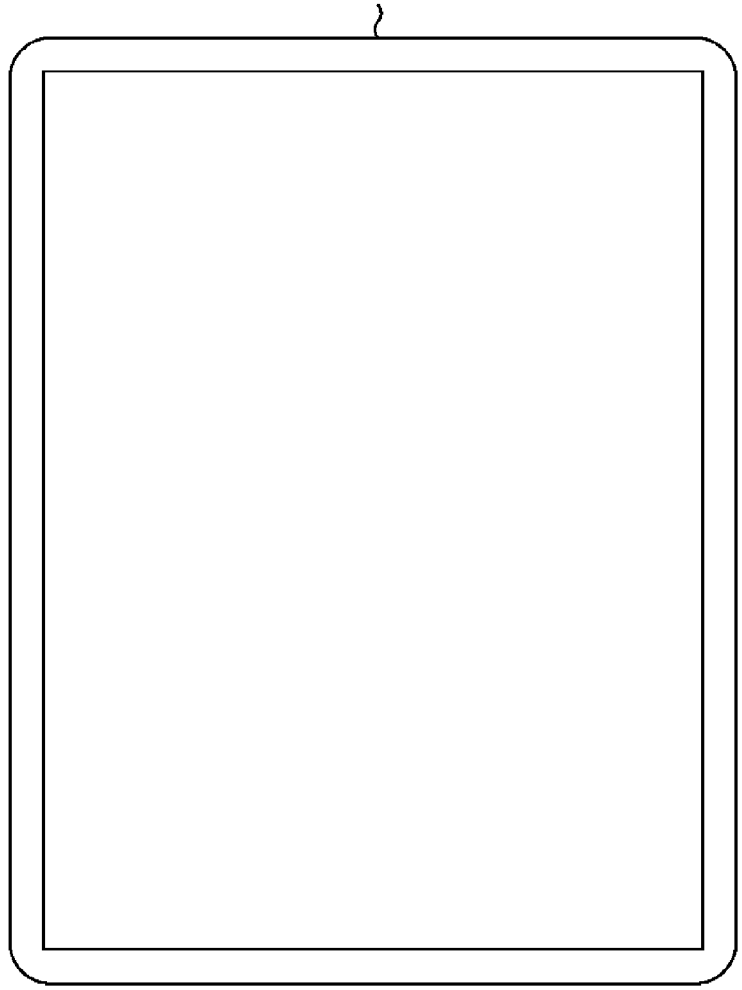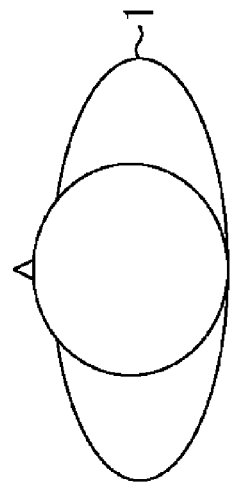
FIG.2

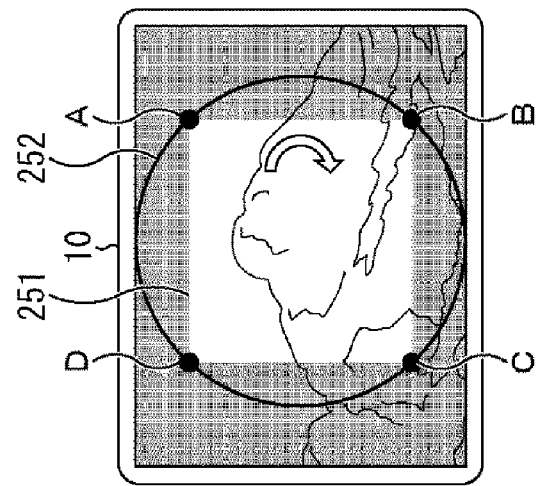
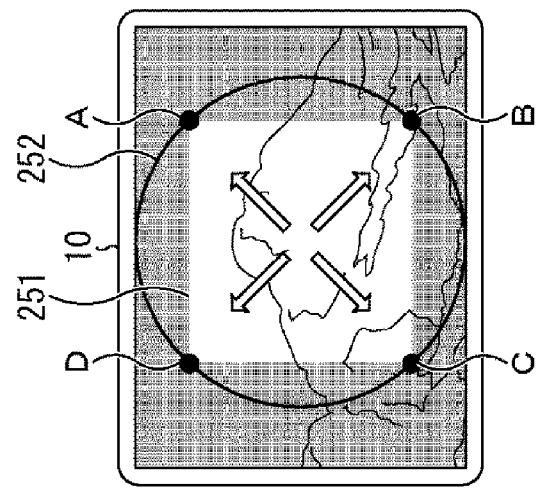
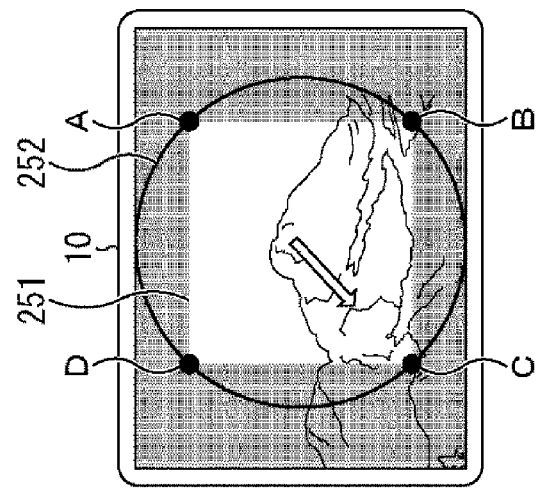

APPARATUS, METHOD AND PROGRAM FOR CUTTING OUT A PART OF AN IMAGE

CROSS REFERENCE TO RELATED APPLICATIONS

This application claims the benefit of Japanese Priority Patent Application JP 2013-095886 filed Apr. 30, 2013, the entire contents of which are incorporated herein by reference.

BACKGROUND

The present disclosure relates to an image processing apparatus, an image processing method, and a program, more particularly, to an image processing apparatus, an image processing method, and a program with which operability in an image cutout operation can be improved.

In recent years, along with a prevalence of digital still cameras, editing processing is generally performed on a photographed image as digital data after photographing. As such image editing processing, there is image cutout processing that involves partially cutting out a photographed image in a rectangle and removing unnecessary parts (see, for example, Japanese Patent Application Laid-open No. 2007-281650).

As shown in FIG. 1, for example, in a case where an image editing application program is activated and an image editing is to be performed by a mouse operation in a personal computer, an editing target image is first selected to be displayed from photographed images, and a corner of an area to be cut out from the editing target image is clicked to determine a reference position. Then, a drag operation is performed diagonally from the reference position so as to set an arbitrary cutout frame and enable the image in the frame to be cut out.

SUMMARY

With the technique of the related art, however, since an appropriate cutout frame is not preset, a user finds it difficult to intuitively understand a content or area of an image to be a cutout target. Moreover, although electronic apparatuses including a touch panel have prevailed in recent years, the image cutout operation described above presupposes a mouse operation, and thus operability is impaired when performing image editing by a touch panel operation. Such a point is desired to be improved.

The present disclosure has been made in view of the circumstances as described above, and thus there is a need to enable operability in an image cutout operation to be improved.

According to an embodiment of the present disclosure, there is provided an image processing apparatus including: a cutout frame setting section configured to set a cutout frame for partially cutting out an editing target image as an editing target; an image editing section configured to edit, in response to an instruction from a user, an image in the cutout frame superimposed on the editing target image; and a cutout image generation section configured to cut out the image in the cutout frame from the editing target image and generate a cutout image.

A shape of the cutout frame is restricted and deformed by a circular guide provided on the editing target image.

A center position of the circular guide matches with a center position of a predetermined target on the same plane.

A radius of the circular guide takes a value maximized using a width of the predetermined target as a reference.

The predetermined target is one of a screen of a display section that displays the editing target image, an image display area of an application program for editing the editing target image, and the editing target image.

The cutout frame is in internal contact with the circular guide, and the shape thereof is deformed as apexes move along the circular guide.

The cutout frame is rectangular, and four apexes thereof move along the circular guide.

The shape of the cutout frame becomes, when a center angle formed by two apexes that move along an arc on one of an upper side and a lower side of the circular guide and a center point is widened, laterally longer than that before the apexes move, and becomes longitudinally longer than that before the apexes move when the center angle is narrowed.

A horizontal to vertical ratio of the cutout frame becomes a preset fixed ratio according to positions of the apexes.

A boundary for changing the fixed ratio is preset on the circular guide, and the fixed ratio is changed when the apexes move and cross the boundary.

The fixed ratio is a ratio corresponding to a screen aspect ratio determined based on a predetermined standard.

A horizontal to vertical ratio of the cutout frame becomes an arbitrary ratio corresponding to positions of the apexes.

The editing target image is displayed on a touch panel, and the cutout image is generated based on a touch operation on the touch panel.

The image processing apparatus is a tablet-type electronic apparatus.

The circular guide is not displayed.

According to an embodiment of the present disclosure, there is provided an image processing method and a program corresponding to the image processing apparatus according to the embodiment described above.

According to the image processing apparatus, the image processing method, and the program according to the embodiments of the present disclosure, a cutout frame for partially cutting out an editing target image as an editing target is set, an image in the cutout frame superimposed on the editing target image is edited in response to an instruction from a user, and the image in the cutout frame is cut out from the editing target image to generate a cutout image.

According to the embodiments of the present disclosure, operability in an image cutout operation can be improved.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 2 is a diagram showing an outer appearance of a tablet terminal apparatus to which the present disclosure is applied;

FIGS. 14A, 14B, and 14C are diagrams showing display examples at the time of image editing;

DETAILED DESCRIPTION OF EMBODIMENTS

Hereinafter, an embodiment of the present disclosure will be described with reference to the drawings.

<Structure of Tablet Terminal Apparatus>

(Outer Appearance and Display Example of Tablet Terminal Apparatus)

FIG. 2 is a diagram showing an outer appearance of the tablet terminal apparatus to which the present disclosure is applied.

As shown in FIG. 2, the tablet terminal apparatus 10 is constituted of a plate-like casing including a large screen and assumed to be set on a table as a main usage pattern.

The tablet terminal apparatus 10 includes, together with processing functions as a computer body, a touch panel in which a touch sensor and a display section are integrated. When input operations are made with respect to the touch panel by a finger of a user 1 or a tablet pen, various types of processing corresponding to contents of the input operations are carried out in the tablet terminal apparatus 10.

Figure 1:
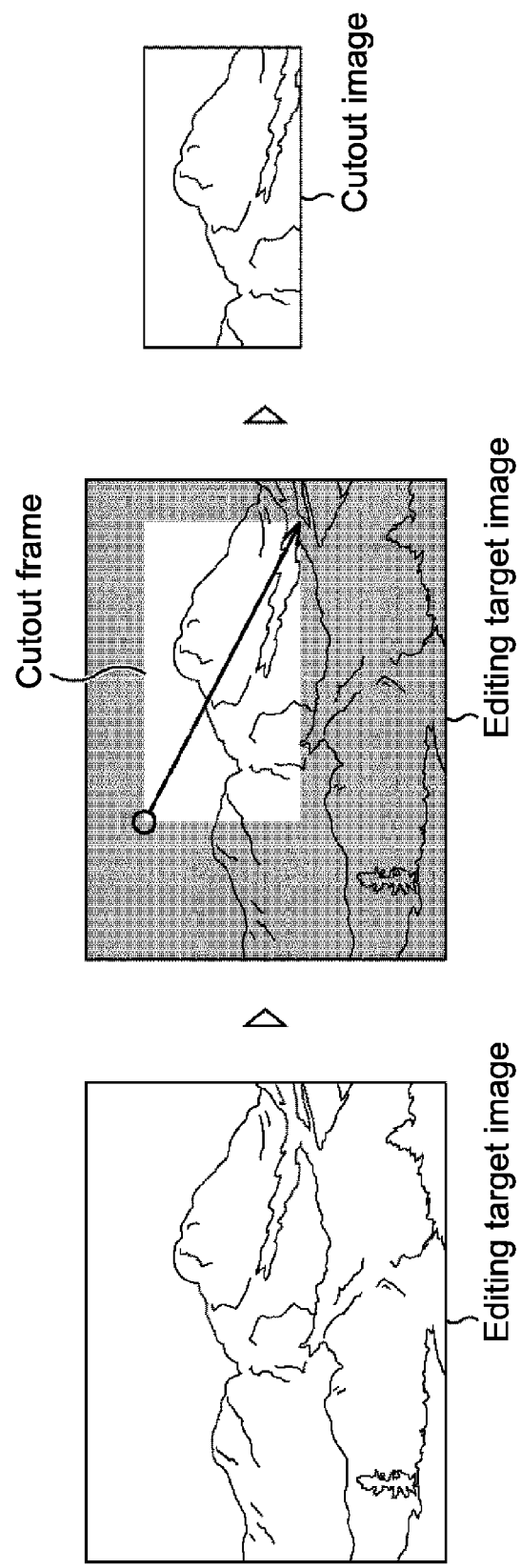
FIG. 1 is a diagram for explaining a flow of an image cutout operation of the related art.
Figure 3:
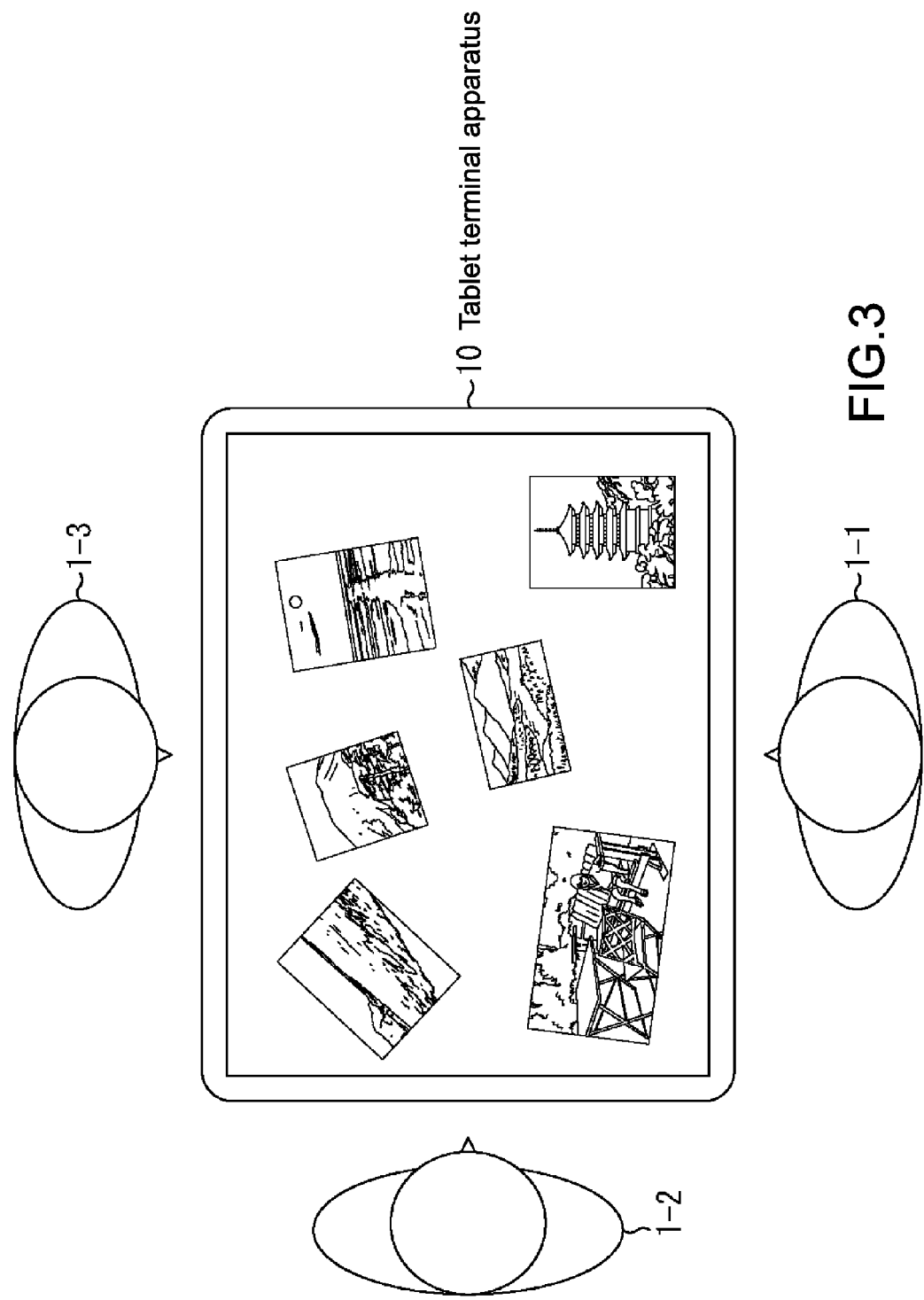
FIG. 3 is a diagram showing a display example of the tablet terminal apparatus to which the present disclosure is applied.

Further, since the tablet terminal apparatus 10 includes a large screen, a plurality of users 1-1 to 1-3 can perform input operations at the same time as shown in FIG. 3. Therefore, it becomes possible to taken in and display photographed images taken by a digital still camera in/on the tablet terminal apparatus 10 so that the plurality of users can cooperatively edit the photographed images, for example.

(Internal Structure of Tablet Terminal Apparatus)

Figure 4:
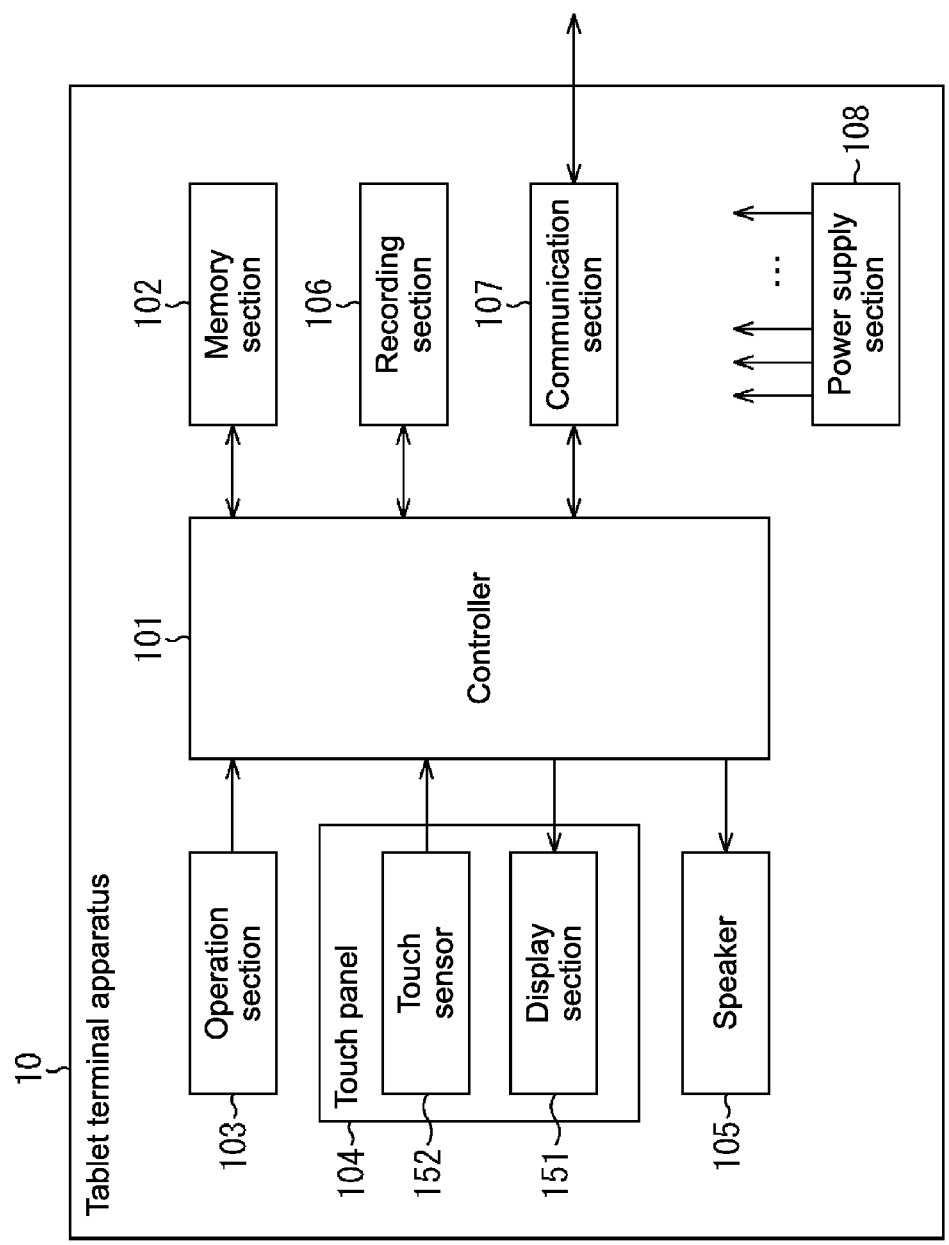
FIG. 4 is a diagram showing an internal structure of the tablet terminal apparatus to which the present disclosure is applied.

FIG. 4 is a diagram showing an internal structure of the tablet terminal apparatus to which the present disclosure is applied.

As shown in FIG. 4, the tablet terminal apparatus 10 shown in FIG. 2 is constituted of a controller 101, a memory section 102, an operation section 103, a touch panel 104, a speaker 105, a recording section 106, a communication section 107, and a power supply section 108.

The controller 101 controls respective sections of the tablet terminal apparatus 10. The memory section 102 temporarily stores various types of data under control of the controller 101.

The operation section 103 is a button or the like provided on the tablet terminal apparatus 10 and supplies an operation signal corresponding to a user operation to the controller 101. The controller 101 controls operations of the respective sections based on the operation signals from the operation section 103.

The touch panel 104 is constituted of a display section 151 and a touch sensor 152 superimposed on a screen of the display section 151. The display section 151 is constituted of a liquid crystal display (LCD) or the like and displays various types of information under control of the controller 101. Further, the touch sensor 152 detects an input operation made with respect to the touch panel 104 by the user 1 along with a position at which the operation has been made on the touch panel 104 and supplies a detection signal to the controller 101.

Here, the input operation detected by the touch sensor 152 includes, for example, an operation of bringing a finger of the user 1 in contact with a surface of the touch panel 104, an operation of moving the finger of the user 1 while the finger is touching the surface of the touch panel 104, and an operation of releasing the finger of the user 1 from the surface of the touch panel 104.

It should be noted that various detection methods such as a capacitance method and an electromagnetic induction method can be adopted for the touch panel 104.

The speaker 105 outputs an audio under control of the controller 101. The recording section 106 is constituted of an HDD (Hard Disk Drive), for example. The recording section 106 records various types of data under control of the controller 101.

The communication section 107 communicates with other electronic apparatuses and various servers (not shown) via a network under control of the controller 101. The power supply section 108 supplies power obtained from a rechargeable battery or an external power supply to the respective sections including the controller 101.

The tablet terminal apparatus 10 is structured as follows.

(Example of Functional Structure of Controller)

Figure 5:
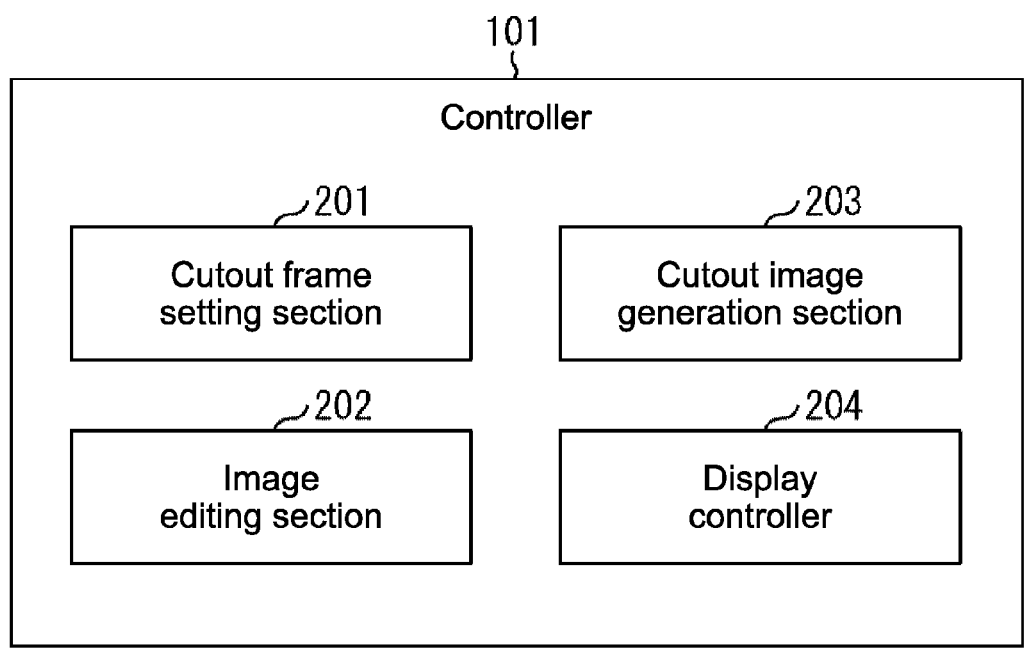
FIG. 5 is a diagram showing an example of a functional structure of a controller.

FIG. 5 is a diagram showing an example of a functional structure of the controller 101 shown in FIG. 4.

As shown in FIG. 5, the controller 101 is constituted of a cutout frame setting section 201, an image editing section 202, a cutout image generation section 203, and a display controller 204.

The cutout frame setting section 201 sets a cutout frame according to an input operation of the user 1. Here, the cutout frame is a frame of a predetermined shape, that designates an area for partially cutting out an editing target image to be an editing target. The cutout frame is superimposed on the editing target image and displayed.

The image editing section 202 edits an image in the cutout frame superimposed on the editing target image according to an input operation of the user 1. As the image editing in this case, for example, various types of processing such as a movement, expansion/contraction, rotation of an image in a cutout frame are performed on the editing target image.

The cutout image generation section 203 cuts out the image in the cutout frame from the editing target image and generates a cutout image according to an input operation of the user 1.

The display controller 204 causes the display section 151 to display various images including an editing target image selected as an editing target from photographed images, an editing target image edited by the image editing section 202, and a cutout image generated by the cutout image generation section 203.

The display controller 204 causes the cutout frame set by the cutout frame setting section 201 to be superimposed and displayed on the editing target image.

The controller 101 is structured as described above.

<Specific Usage Example>

Next, a usage method of the tablet terminal apparatus 10 will be described. Here, as a specific usage method, a case where an editing target image selected from photographed images is partially cut out to generate a desired cutout image will be described.

(Cutout Image Generation Processing)

First, referring to the flowchart of FIG. 6, cutout image generation processing executed by the tablet terminal apparatus 10 will be described.

In Step S11, it is judged whether a desired photographed image has been selected as an editing target image and a start of a cutout operation with respect to the editing target image has been instructed by an input operation of the user 1. When judged that the start of the cutout operation of the editing target image has been instructed by the judgment processing of Step S11, the processing advances to Step S12.

In Step S12, the cutout frame setting section 201 carries out initial setting processing of a cutout frame. In the initial setting processing, a display form of the cutout frame in an initial state is set.

Here, the shape of the cutout frame is restricted and deformed by a circular guide for specifying the shape thereof (hereinafter, referred to as "circular guide"). It should be noted that a center position of the circular guide matches with a center position of a predetermined target on the same plane. Then, the cutout frame is set such that a radius of the circular guide takes a value maximized using a width of the predetermined target as a reference, for example.

Since the screen of the display section 151, an image display area of an image editing application program, an editing target image, and the like correspond to the predetermined target, for example, the display form of the cutout frame is set so that the radius of the circular guide takes a maximum value using the width of those targets as a reference. The display controller 204 causes the cutout frame set by the cutout frame setting section 201 to be superimposed and displayed on the editing target image.

It should be noted that the details of the initial setting processing of the cutout frame will be described later with reference to FIGS. 7, 8A, 8B, and 8C.

When the initial setting processing of the cutout frame of Step S12 ends, the processing advances to Step S13.

In Step S13, it is judged whether a change of an aspect ratio of the cutout frame has been instructed by an input operation of the user 1.

When judged that the change of an aspect ratio of the cutout frame has been instructed in Step S13, the processing advances to Step S14. In Step S14, the cutout frame setting section 201 carries out aspect ratio adjustment processing of the cutout frame.

In the aspect ratio adjustment processing, the aspect ratio of the cutout frame is adjusted according to an input operation of the user 1.

Here, the cutout frame is in internal contact with the circular guide described above, and the shape thereof is deformed as apexes move along the circular guide. For example, the cutout frame is rectangular, and as 4 apexes move along the circular guide, the shape of the cutout frame is deformed, and the aspect ratio is adjusted. The display controller 204 causes the cutout frame adjusted by the cutout frame setting section 201 to be superimposed and displayed on the editing target image.

It should be noted that the details of the aspect ratio adjustment processing of the cutout frame will be described later with reference to FIGS. 9, 12A, 12B, and 12C.

When the aspect ratio adjustment processing of the cutout frame of Step S14 ends, the processing advance to Step S15. When judged that the change of the aspect ratio of the cutout frame has not been instructed in Step S13, the processing of Step S14 is skipped.

In Step S15, it is judged whether editing with respect to an image in the cutout frame has been instructed by an input operation of the user 1. When judged that editing with respect to the image in the cutout frame has been instructed in Step S15, the processing advances to Step S16.

In Step S16, the image editing section 202 carries out image editing processing. As the image editing in this case, various types of processing such as a movement, expansion/contraction, rotation of an image in the cutout frame are performed on the editing target image. The display controller 204 causes the display section 151 to display the editing target image edited by the image editing section 202.

It should be noted that the details of the image editing processing will be described later with reference to FIGS. 13, 14A, 14B, and 14C.

When the image editing processing of Step S16 ends, the processing advances to Step S17. Moreover, when judged that editing with respect to the image in the cutout frame has not been instructed in Step S15, the processing advances to Step S17.

In Step S17, it is judged whether determination of a cutout image has been instructed by an input operation of the user 1. When judged that the determination of the cutout image has not been instructed in Step S17, the processing returns to Step S13 so that subsequent processing are repeated.

Specifically, by repeating the processing of Steps S13 to S17, the shape of the cutout frame is adjusted, and various types of image editing processing with respect to the image in the cutout frame are carried out.

When judged that the determination of the cutout image has been instructed in Step S17, the processing advances to Step S18. In Step S18, the cutout image generation section 203 cuts out the image in the cutout frame from the editing target image and generates a cutout image. The display controller 204 causes the display section 151 to display the cutout image generated by the cutout image generation section 203.

A desired cutout image is generated as described above.

(Initial Setting Processing of Cutout Frame)

Next, with reference to the flowchart of FIG. 7, the details of the initial setting processing of the cutout frame corresponding to Step S12 of FIG. 6 will be described.

In Step S61, the cutout frame setting section 201 judges whether the circular guide of the cutout frame is to be matched with the width of the screen of the display section 151 based on the display form of the editing target image, for example.

When judged that the circular guide of the cutout frame is to be matched with the width of the screen of the display section 151 in Step S61, the predetermined target becomes the screen of the display section 151. Therefore, the processing advances to Step S62. In Step S62, the cutout frame setting section 201 sets the radius of the circular guide of the cutout frame to take a value maximized with respect to the width of the screen of the display section 151.

Figure 8C:
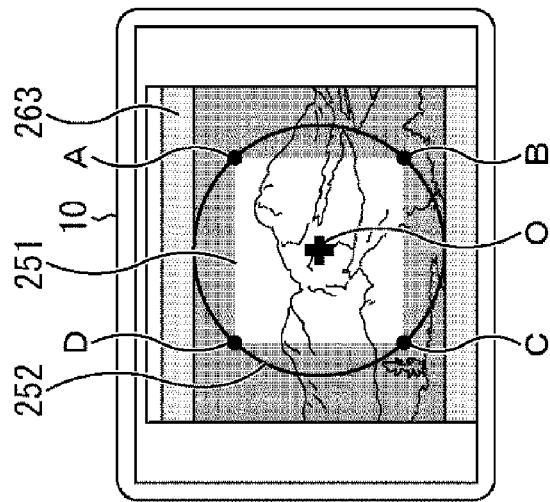
FIGS. 8A, 8B, and 8C are diagrams showing initial display examples of a cutout frame.
Figure 8B:
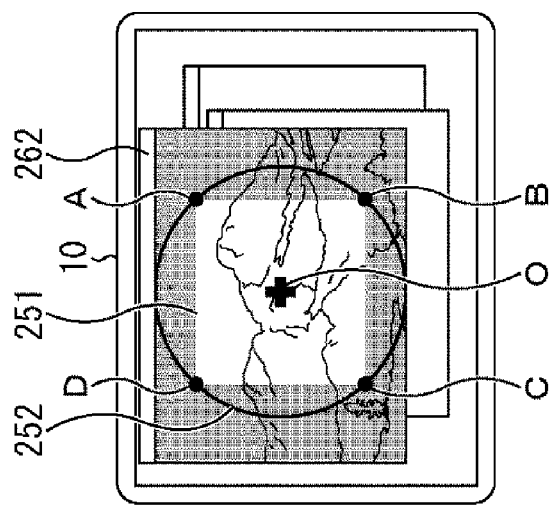
Figure 8A:
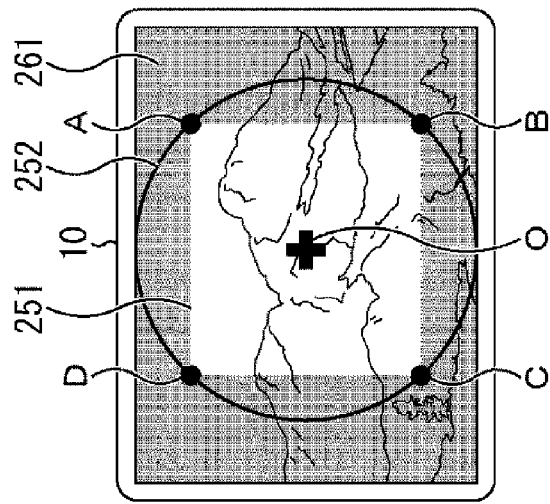

Specifically, as shown in FIG. 8A, a radius of a circular guide 252 is maximized with respect to a width of a screen 261 of the display section 151. Further, at this time, a center position of the circular guide 252 and a center position of the screen of the display section 151 coincide at a position O indicated by the cross in the figure.

It should be noted that the rectangular cutout frame 251 is in internal contact with the circular guide 252, and operators A to D positioned at 4 apexes are movable on the circular guide 252. In other words, the circular guide 252 centering on the position O is a circumscribed circle of the cutout frame 251 having the operators A to D on its guide as the apexes.

Figure 7:
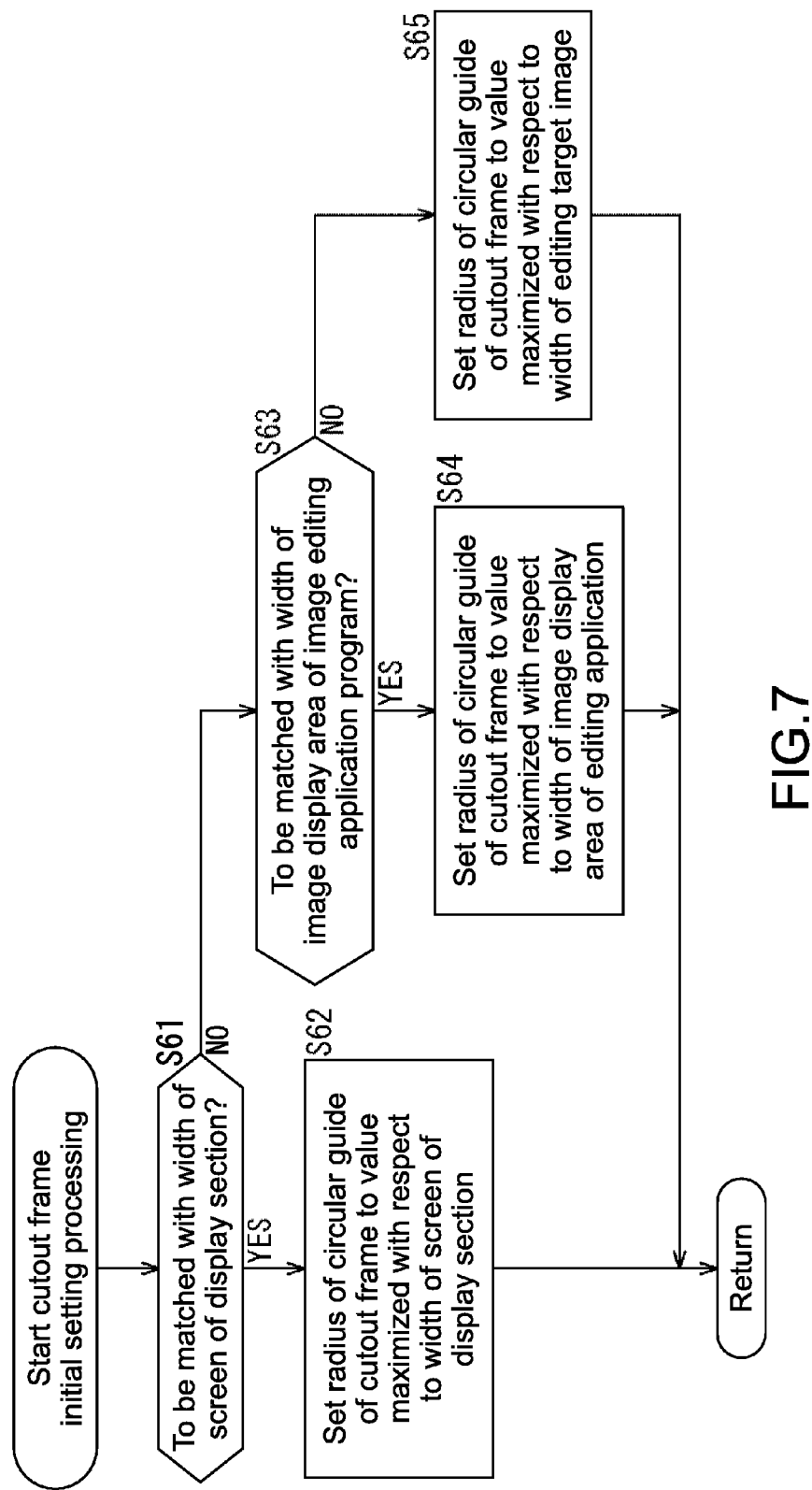
FIG. 7 is a flowchart for explaining details of cutout frame initial setting processing.

Referring back to the flowchart of FIG. 7, when judged that the circular guide of the cutout frame is not to be matched with the width of the screen of the display section 151 in Step S61, the processing advances to Step S63. In Step S63, the cutout frame setting section 201 judges whether the circular guide of the cutout frame is to be matched with a width of the image display area of the image editing application program based on the display form of the editing target image, for example.

When judged that the circular guide of the cutout frame is to be matched with the width of the image display area of the image editing application program in Step S63, the predetermined target becomes the image display area of the image editing application program. Therefore, the processing advances to Step S64. In Step S64, the cutout frame setting section 201 sets the radius of the circular guide of the cutout frame to take a value maximized with respect to the width of the image display area of the image editing application program.

Specifically, as shown in FIG. 8B, the radius of the circular guide 252 is maximized with respect to the width of the image display area of the image editing application program 262. Further, at this time, the center position of the circular guide 252 and a center position of the image display area of the image editing application program coincide at the position O in the figure. Moreover, the operators A to D positioned at the 4 apexes of the cutout frame 251 are movable on the circular guide 252.

Referring back to the flowchart of FIG. 7, when judged that the circular guide of the cutout frame is not to be matched with the width of the image display area of the image editing application program in Step S63, the predetermined target becomes the editing target image. Therefore, the processing advances to Step S65. In Step S65, the cutout frame setting section 201 sets the radius of the circular guide of the cutout frame to take a value maximized with respect to the width of the editing target image.

Specifically, as shown in FIG. 8C, the radius of the circular guide 252 is maximized with respect to the width of the editing target image 263. Further, at this time, the center position of the circular guide 252 and a center position of the editing target image coincide at the position O in the figure. Moreover, the operators A to D positioned at the 4 apexes of the cutout frame 251 are movable on the circular guide 252.

Referring back to the flowchart of FIG. 7, when the processing of Step S62, S64, or S65 ends, the processing returns to Step S12 so that the subsequent processing are executed.

It should be noted that for convenience of explanations, in FIGS. 8A, 8B, and 8C, the center position O (cross in figure) of the circular guide 252 (circle in figure) is superimposed and displayed on the editing target image. However, it is also possible to hide the circular guide 252 and the center position O and superimpose and display only the cutout frame 251 and the operators A to D.

Heretofore, the initial setting processing of the cutout frame has been described. By the initial setting processing of the cutout frame, the center position of the circular guide matches with a center position of a predetermined target, and the radius of the circular guide is maximized with respect to the predetermined target, with the result that the cutout frame in internal contact with the circular guide can be superimposed and displayed most efficiently while being maximized.

(Aspect Ratio Adjustment Processing of Cutout Frame)

Next, with reference to the flowchart of FIG. 9, details of the aspect ratio adjustment processing of the cutout frame corresponding to Step S14 of FIG. 6 will be described.

In Step S111, the cutout frame setting section 201 judges whether the operator has moved in a direction that widens a center angle of the circular guide by an input operation of the user 1.

Here, the center angle of the circular guide refers to an angle formed by the two apexes that move along an arc on an upper or lower side of the circular guide and the center point (center position O). In other words, as shown in FIGS. 10A, 10B, and 10C, the center angle refers to a center angle with respect to an arc AD of the operators A and D that move along an upper-side arc of the circular guide 252 (angle AOD) or a center angle with respect to an arc BC of the operators B and C that move along a lower-side arc of the circular guide 252 (angle BOC).

Figure 9:
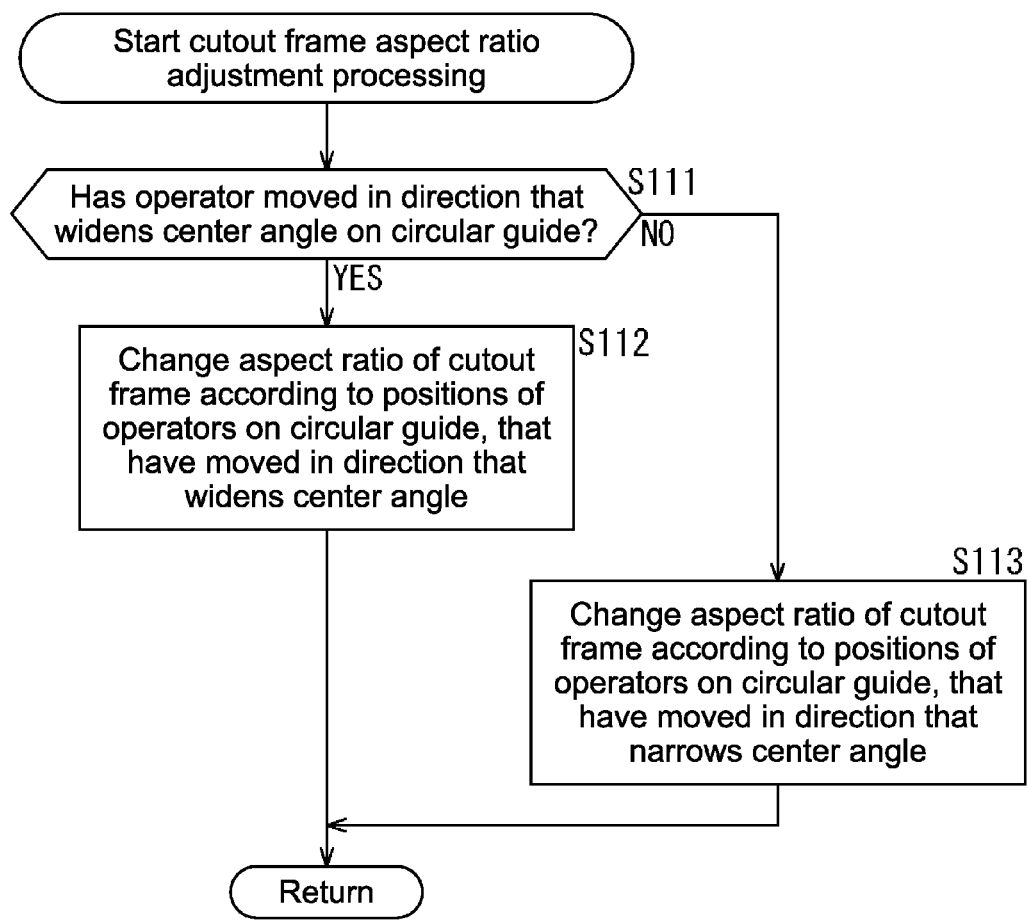
FIG. 9 is a flowchart for explaining details of cutout frame aspect ratio adjustment processing.

Referring back to the flowchart of FIG. 9, when judged that the operator has moved in the direction that widens the center angle of the circular guide in Step S111, the processing advances to Step S112. In Step S112, the cutout frame setting section 201 changes the aspect ratio of the cutout frame based on the positions of the operators on the circular guide, that have moved in the direction that widens the center angle of the circular guide.

Figure 10:
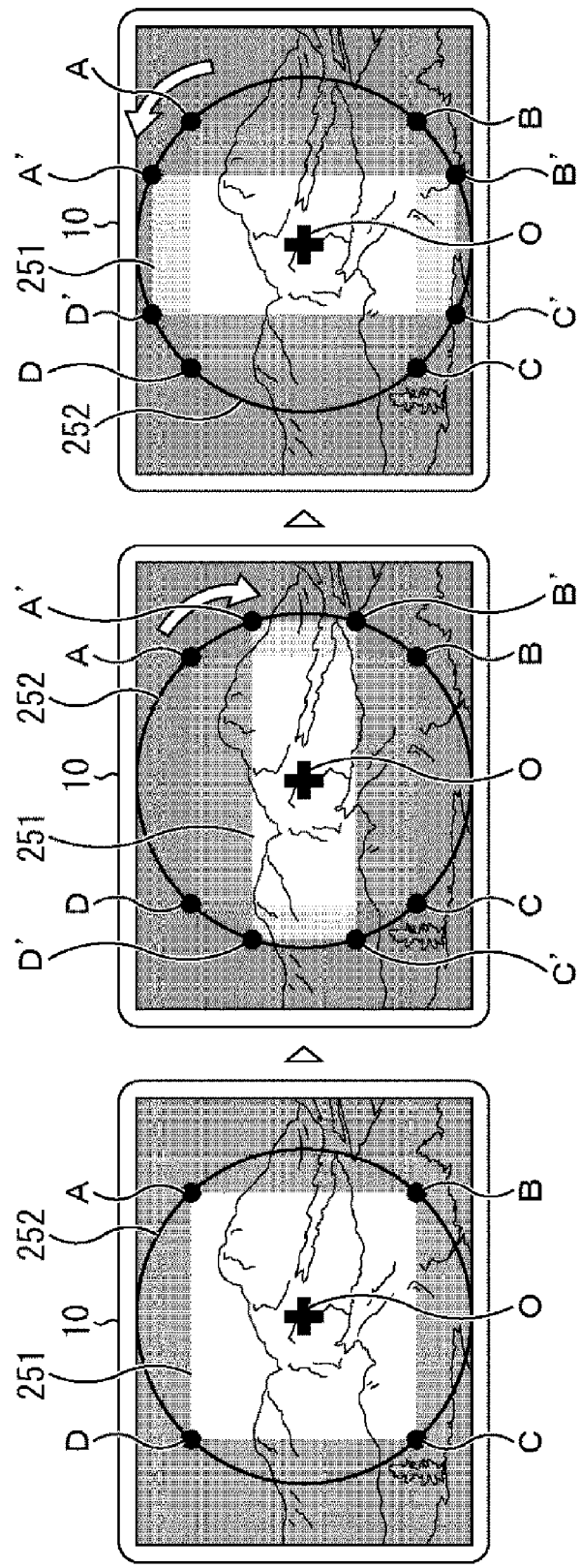
FIGS. 10A, 10B, and 10C are diagrams showing display examples at the time of a cutout frame aspect ratio adjustment.

Specifically, FIG. 10B shows a state where a movement operation is made by the user 1 in the initial state shown in FIG. 10A, and the operators of the 4 apexes of the cutout frame 251 move in the direction that widens the center angle of the circular guide 252. It should be noted that the "movement operation" refers to an operation of touching a desired target (e.g., operator A) on the touch panel 104 with a finger and moving the finger in that state.

In the state shown in FIG. 10B, of the 4 apexes of the cutout frame 251, the upper-side operators A and D respectively move to A' and D', and the lower-side operators B and C respectively move to B' and C'. Due to such a movement of the operators, the positions of the operators A and D and the positions of the operators B and C are set apart from one another on the circular guide 252, with the result that the lateral sides of the cutout frame 251 become long while the longitudinal sides thereof become short.

Accordingly, the aspect ratio of the cutout frame 251 is changed as shown in FIG. 10B to result in a laterally-long rectangle.

It should be noted that in FIGS. 10A, 10B, and 10C, when one operator is operated and moved on the circular guide 252, other operators also move on the circular guide 252 in an interlocking manner. For example, when the operator A is moved in the direction indicated by the arrow in FIG. 10B, the operators B to D also move in the direction that widens the center angle in an interlocking manner with the operator A.

Referring back to the flowchart of FIG. 9, when judged that the operators have not moved in the direction that widens the center angle of the circular guide, that is, the operators have moved in a direction that narrows the center angle of the circular guide in Step S111, the processing advances to Step S113. In Step S113, the cutout frame setting section 201 changes the aspect ratio of the cutout frame according to the positions of the operators on the circular guide, that have moved in the direction that narrows the center angle of the circular guide.

Specifically, FIG. 10C shows a state where a movement operation is made by the user 1 in the initial state shown in FIG. 10A, and the operators of the 4 apexes of the cutout frame 251 move in the direction that narrows the center angle of the circular guide 252. In the state shown in FIG. 10C, of the 4 apexes of the cutout frame 251, the upper-side operators A and D respectively move to A' and D', and the lower-side operators B and C respectively move to B' and C'. Due to such a movement of the operators, the positions of the operators A and D and the positions of the operators B and C approach one another on the circular guide 252, with the result that the longitudinal sides of the cutout frame 251 become long while the lateral sides thereof become short.

Accordingly, the aspect ratio of the cutout frame 251 is changed as shown in FIG. 10C to result in a longitudinally-long rectangle.

It should be noted that, for example, when the operator A is moved in the direction indicated by the arrow in FIG. 10C, the operators B to D also move in the direction that narrows the center angle in an interlocking manner with the operator A.

Further, a horizontal to vertical ratio of the aspect ratio of the cutout frame 251 may be set to be an arbitrary ratio corresponding to the positions of the apexes or may be set to be a preset fixed ratio. In the case of a fixed ratio, for example, it is possible to change the horizontal to vertical ratio of the cutout frame 251 to only a typical aspect ratio corresponding to a screen aspect ratio determined based on a predetermined standard, such as 1:1, 4:3, 3:2, and 16:9.

Figure 11:
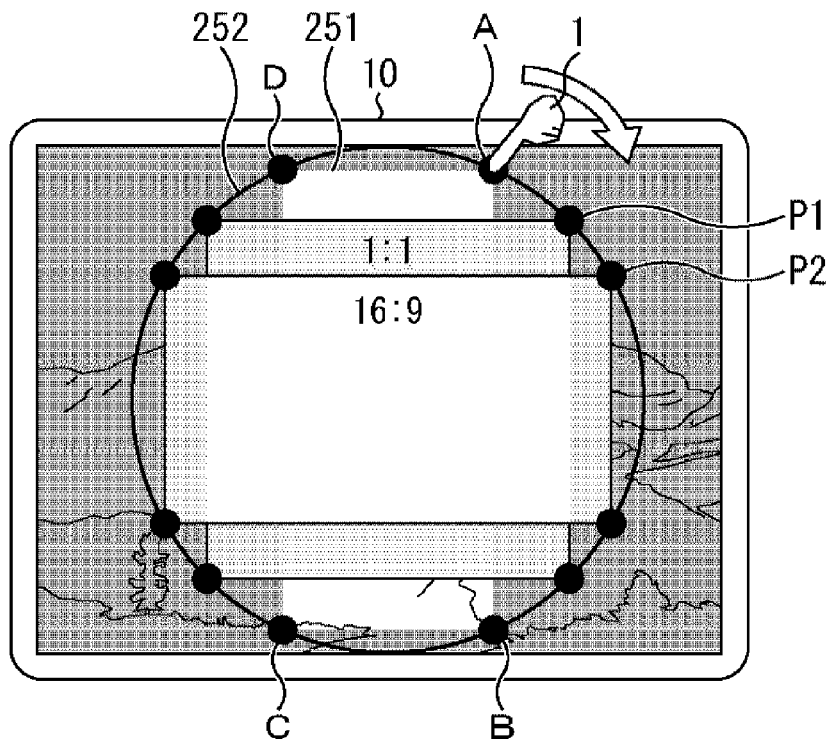
FIG. 11 is a diagram showing an example of the cutout frame aspect ratio.

For example, as shown in FIG. 11, when the operator A of the cutout frame 251 is moved in the direction that widens the center angle on the circular guide 252, the aspect ratio of the cutout frame 251 can be changed to only the fixed aspect ratio such as 1:1 and 16:9.

Specifically, the aspect ratio of the cutout frame 251 becomes 1:1 when the operator A moves to a position P1 on the circular guide 252, and the aspect ratio of the cutout frame 251 becomes 16:9 when the operator A moves to a position P2 on the circular guide 252. Accordingly, the user 1 can positively set a typical aspect ratio for the cutout frame 251.

Figures 12A, 12B, 12C:
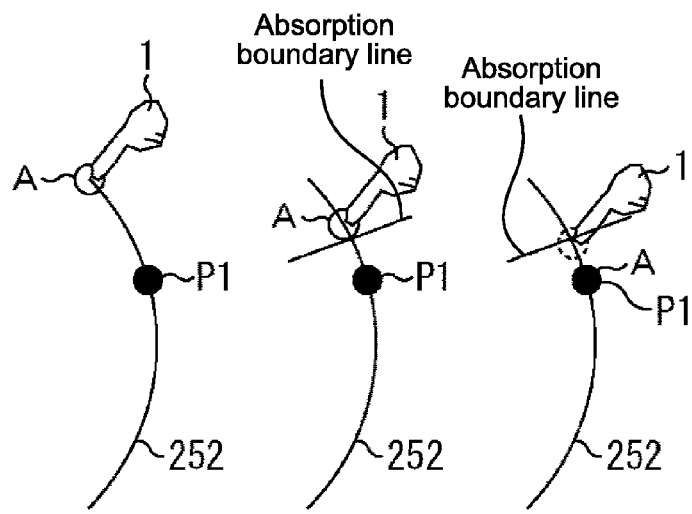
FIGS. 12A, 12B, and 12C are diagrams for explaining an adsorption boundary line.

At this time, by presetting an absorption boundary line, that is a boundary of a fixed ratio, in the vicinity of the position P1 or P2 on the circular guide 252 as shown in FIGS. 12A, 12B, and 12C, it is assumed that the operator A moving on the circular guide 252 has reached the position P1 or P2 at a time point the operator A crosses the absorption boundary line before reaching the position P1 or P2.

Specifically, since the operator A has crossed the absorption boundary line in FIG. 12C although it has not crossed the absorption boundary line in FIGS. 12A and 12B, the operator A is absorbed to the position P1 at the time point it crosses the absorption boundary line, and the aspect ratio of the cutout frame 251 is changed to the fixed ratio of 1:1. As a result, operability in changing the aspect ratio of the cutout frame 251 can be improved.

Figure 6:
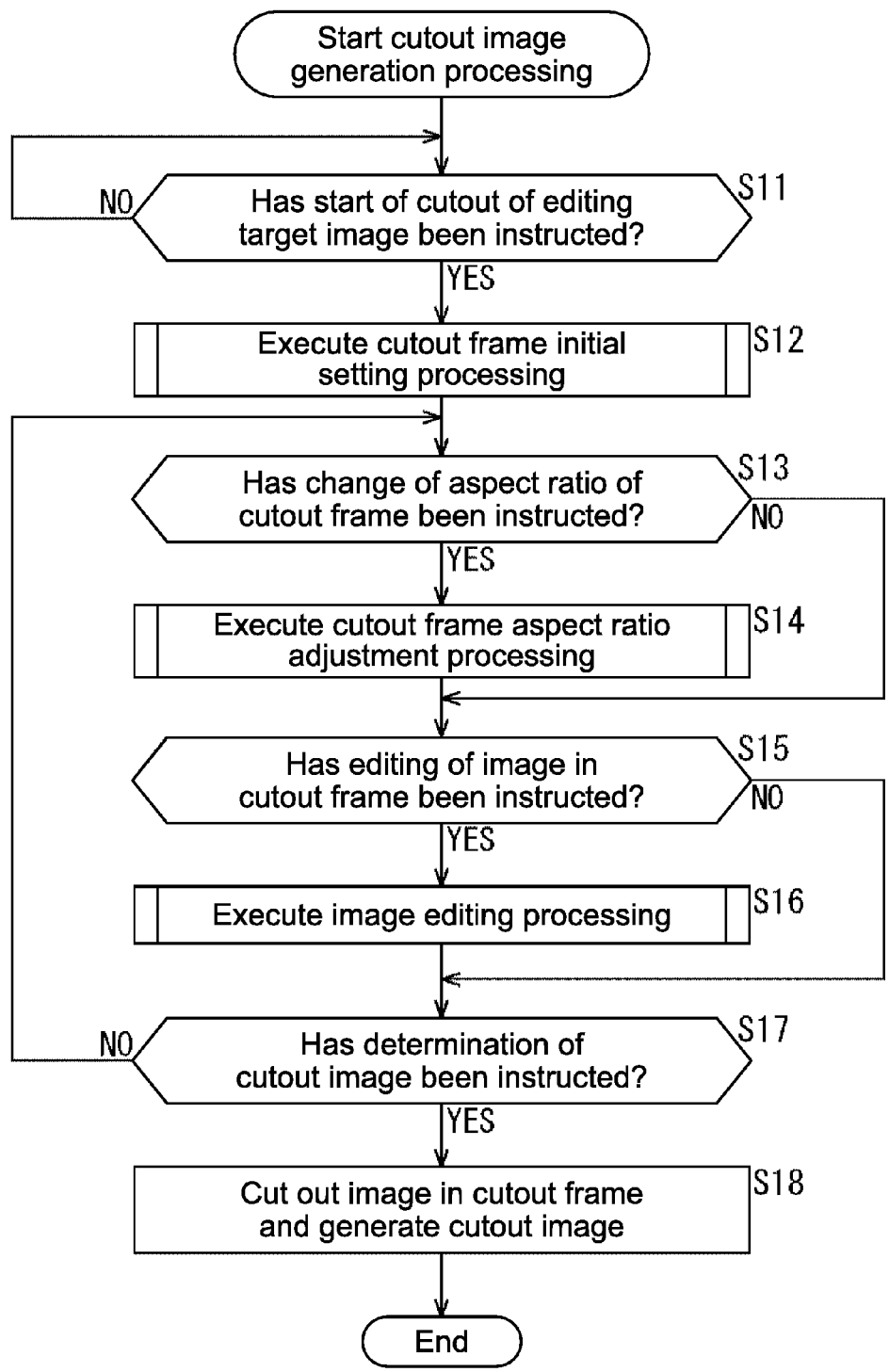
FIG. 6 is a flowchart for explaining cutout image generation processing.

Referring back to the flowchart of FIG. 9, when the processing of Step S112 or S113 ends, the processing returns to Step S14 of FIG. 6 so that the subsequent processing are executed.

It should be noted that for convenience of explanations, in FIGS. 10A, 10B, 10C, 12A, 12B, and 12C, the center position O (cross in figure) of the circular guide 252 (circle in figure) is superimposed and displayed on the editing target image. However, it is also possible to hide the circular guide 252 and the center position O and superimpose and display only the cutout frame 251 and the operators A to D.

Heretofore, the aspect ratio adjustment processing of the cutout frame has been described. By the aspect ratio adjustment processing of the cutout frame, the user 1 can easily adjust the aspect ratio of the cutout frame 251 by merely moving one of the operators A to D on the circular guide 252, and thus operability in adjusting the cutout frame 251 can be improved. Also in this case, the center position of the circular guide matches with a center position of a predetermined target, and the radius of the circular guide is maximized with respect to the predetermined target, with the result that the cutout frame in internal contact with the circular guide can be superimposed and displayed most efficiently while being maximized.

(Image Editing Processing)

Next, with reference to the flowchart of FIG. 13, the details of the image editing processing corresponding to Step S16 of FIG. 6 will be described.

In Step S161, it is judged whether a movement of an image in a cutout frame has been instructed by an input operation of the user 1.

When judged that the movement of an image in the cutout frame has been instructed in Step S161, the processing advances to Step S162. In Step S162, the image editing section 202 moves the image in the cutout frame according to the input operation of the user 1.

Specifically, as shown in FIG. 14A, when the user 1 performs a scroll operation on an image in the cutout frame 251 in the direction indicated by the arrow in the figure, the image in the cutout frame is moved in the direction corresponding to the operation amount. It should be noted that the "scroll operation" refers to an operation of placing a finger on a desired area on the touch panel 104 and moving or lightly sweeping it with the finger in that state. Accordingly, an area of the editing target image designated by the cutout frame 251 is changed, and a position of an area to be cut out as a cutout image can be adjusted.

Figure 13:
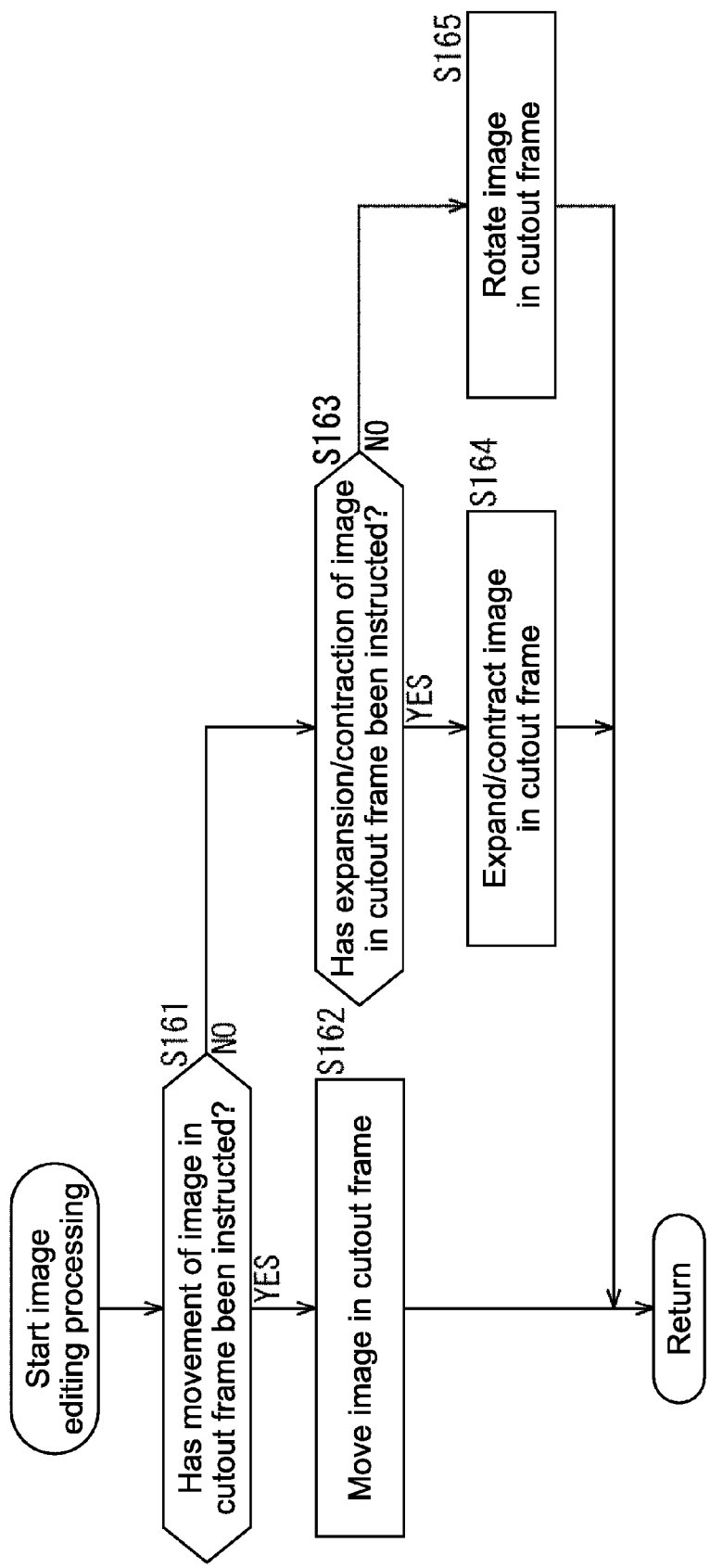
FIG. 13 is a flowchart for explaining details of image editing processing.

Referring back to the flowchart of FIG. 13, when judged that the movement of the image in the cutout frame has not been instructed in Step S161, the processing advances to Step S163. In Step S163, it is judged whether expansion or contraction of the image in the cutout frame has been instructed by an input operation of the user 1.

When judged that expansion or contraction of the image in the cutout frame has been instructed in Step S163, the processing advances to Step S164. In Step S164, the image editing section 202 expands or contracts the image in the cutout frame according to the input operation of the user 1.

Specifically, as shown in FIG. 14B, when the user 1 performs an expansion operation on the image in the cutout frame 251 in the direction indicated by the arrow in the figure, the image in the cutout frame is expanded by a magnification corresponding to the operation amount. It should be noted that the "expansion operation" refers to an operation of placing two fingers on a desired area on the touch panel 104 and widening a gap between the fingers.

Further, when the user 1 performs a contraction operation on the image in the cutout frame 251, the image in the cutout frame is contracted in a reduction ratio corresponding to the operation amount. It should be noted that the "contraction operation" refers to an operation of placing two fingers on a desired area on the touch panel 104 and narrowing a gap between the fingers.

Accordingly, the magnification of the area of the editing target image designated by the cutout frame 251 is changed, and a size of the area to be cut out as a cutout image can be adjusted.

Referring back to the flowchart of FIG. 13, when judged that the expansion or contraction of the image in the cutout frame has not been instructed, that is, rotation of the image in the cutout frame has been instructed in Step S163, the processing advances to Step S165. In Step S165, the image editing section 202 rotates the image in the cutout frame according to the input operation of the user 1.

Specifically, as shown in FIG. 14C, when the user 1 performs a rotation operation on the image in the cutout frame 251 in the direction indicated by the arrow in the figure, the image in the cutout frame is rotated in the direction corresponding to the operation amount. It should be noted that the "rotation operation" refers to an operation of placing a finger on a desired area on the touch panel 104 and moving the finger in the right- or left-hand direction in that state. Accordingly, a direction of an area to be cut out as a cutout image from the editing target image can be adjusted.

Referring back to the flowchart of FIG. 13, when the processing of Step S162, S164, or S165 ends, the processing returns to Step S16 of FIG. 6 so that the subsequent processing are executed.

It should be noted that for convenience of explanations, the processing of movement, expansion/contraction, and rotation have been described as the image editing processing with respect to the image in the cutout frame. However, those processing are mere examples, and other image editing processing may be carried out instead.

Heretofore, the image editing processing has been described. By the image editing processing, the user 1 can adjust a position, size, direction, and the like of an area to be cut out as a cutout image in the cutout frame superimposed on the editing target image. Also in this case, the center position of the circular guide matches with a center position of a predetermined target, and the radius of the circular guide is maximized with respect to the predetermined target, with the result that the cutout frame in internal contact with the circular guide can be superimposed and displayed most efficiently while being maximized.

(Serial Flow of Image Cutout Operation)

Figure 15:
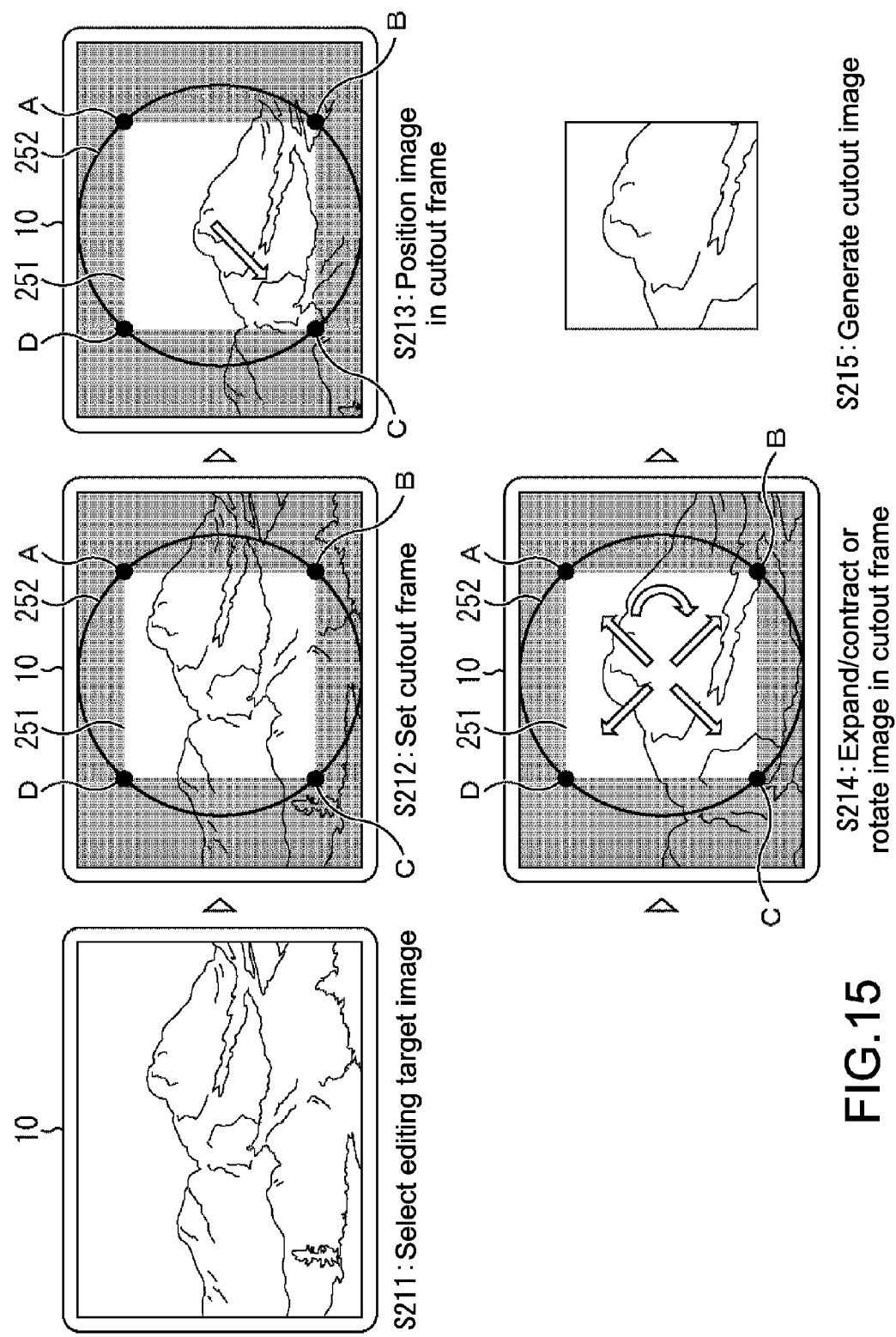
FIG. 15 is a diagram for explaining a flow of an image cutout operation according to an embodiment of the present disclosure.

FIG. 15 is a diagram for explaining a serial flow of an image cutout operation of an image by the user 1.

The user 1 first selects a desired photographed image as an editing target image from a plurality of photographed images and instructs a start of a cutout operation with respect to the editing target image (S211). Since the cutout frame 251 is superimposed and displayed on the editing target image, the user 1 moves one of the operators A to D on the circular guide 252 and sets the cutout frame 251 in a predetermined shape.

As a result, the user 1 can adjust the aspect ratio of the cutout frame 251 by merely moving the operator without operating other operation screens, and thus operability in adjusting the aspect ratio of the cutout frame 251 can be improved. Moreover, since the cutout frame 251 is restricted and deformed by the circular guide 252, an area including a center position of a predetermined target of a screen or the like is constantly captured within the frame, with the result that a cutout target can be designated accurately.

Furthermore, since the cutout frame 251 is superimposed and displayed on the editing target image simultaneous with the start of the cutout operation, the user 1 can intuitively understand the content and area of the image to be a cutout target.

Next, by performing a scroll operation on an image in the cutout frame 251, the user 1 adjusts a position of an area to be cut out as a cutout image (Step S213). Further, by performing an expansion or contraction operation on the image in the cutout frame 251, the user 1 adjusts a size of the area to be cut out as the cutout image (S214). Moreover, by performing a rotation operation on the image in the cutout frame 251, the user 1 adjusts a direction of the area to be cut out as the cutout image (S214).

At this time, since an area including a center position of a predetermined target of a screen or the like is constantly captured in the cutout frame 251, the user 1 can constantly adjust the image in the frame in the vicinity of the center position of the predetermined target, with the result that the operability can be improved.

Then, after adjusting the position, size, direction, and the like of the area to be cut out as the cutout image, the user 1 instructs a generation of a cutout image. Accordingly, the image in the cutout frame 251 is generated as the cutout image (S215).

In the tablet terminal apparatus 10, the image cutout operation is carried out as described above.

Figure 16:
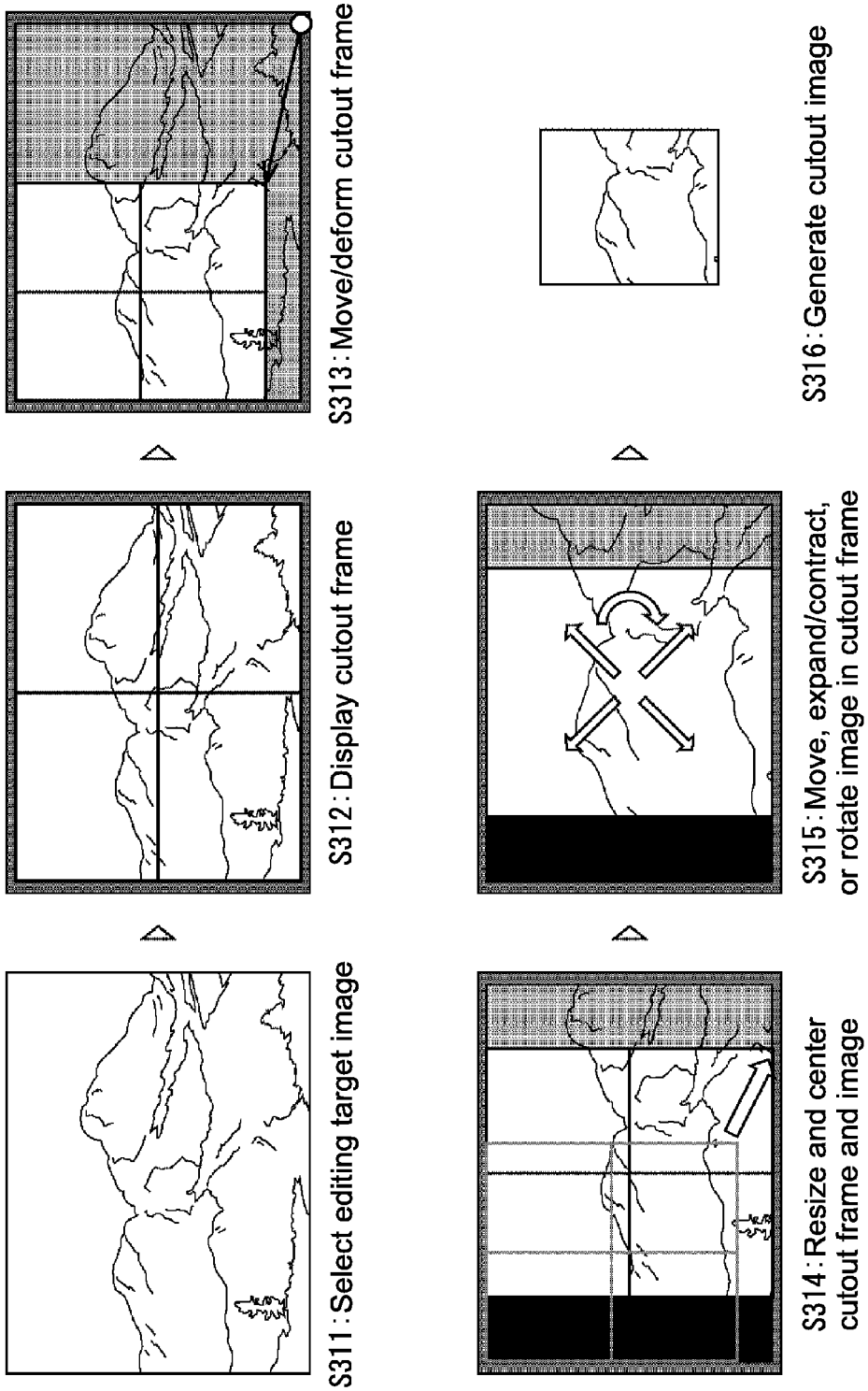
FIG. 16 is a diagram for explaining a comparison with another image cutout method.

It should be noted that FIG. 16 shows another image cutout method. In this method, however, a cutout frame that is of the same size as an editing target image is displayed, and when the cutout frame is moved or deformed (S313), a resize or centering of an image in the cutout frame is performed subserviently (S314). As described above, by the method shown in FIG. 16, the size and position of the image in the cutout frame are frequently adjusted according to an operation on the cutout frame to cause a visual inconvenience or a user standby time, thus resulting in poor operability. In contrast, in the method of the present disclosure, the center position of the circular guide matches with a center position of a predetermined target, and the radius of the circular guide is maximized with respect to the predetermined target, with the result that the cutout frame in internal contact with the circular guide can be superimposed and displayed on the editing target image most efficiently while being maximized. Consequently, a visual inconvenience or a standby time as in FIG. 16 is not caused.

Modified Example

Figure 17:
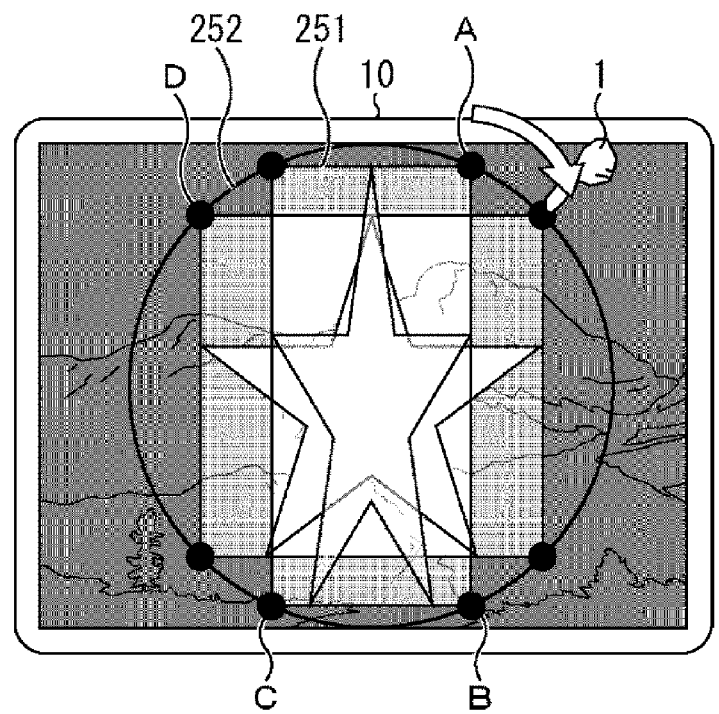
FIG. 17 is a diagram showing other examples of the shape of the cutout frame.

In the descriptions above, the cutout frame has been a rectangle. However, the shape is not limited to a rectangle, and the cutout frame 251 may be of a star shape as shown in FIG. 17, for example. In this case, the cutout frame 251 having a star shape is integrated with a square in internal contact with the circular guide 252, and 4 apexes of the square become operators A to D. Therefore, by moving the operators in the direction that widens the center angle of the circular guide as in the case of the rectangular cutout frame described above, the star-shaped cutout frame 251 becomes a laterally-long star shape. Moreover, by moving the operators in the direction that narrows the center angle of the circular guide, the star-shaped cutout frame 251 becomes a longitudinally-long star shape.

Figure 18:
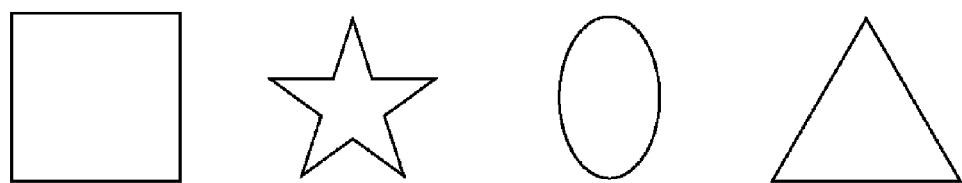
FIG. 18 is a diagram showing other examples of the shape of the cutout frame.

Furthermore, the cutout frame 251 may take shapes other than a rectangle and a star, such as an oval and a triangle, as shown in FIG. 18. The point is, the shape is arbitrary as long as it can be expressed on a square in internal contact with the circular guide 252.

It should be noted that in the descriptions above, a photographed image photographed by a digital still camera has been exemplified as the editing target image. However, the image is not limited to a photographed image, and any digital data image can be selected as the editing target image.

Moreover, in the descriptions above, a tablet terminal apparatus has been exemplified as the image processing apparatus to which the present disclosure is applied. However, the present disclosure is not limited to the tablet terminal apparatus and is also applicable to, for example, an electronic apparatus including a touch panel, such as a cellular phone and a smartphone, and an electronic apparatus that is operated via a predetermined input apparatus (e.g., mouse), such as a personal computer.

<Description on Computer to which Present Disclosure is Applied>

The series of processing described above can be executed either by hardware or software. When executing the series of processing by software, a program constituting the software is installed in a computer. Here, the computer includes a computer incorporated into dedicated hardware and a computer capable of executing various functions by installing various programs, such as a versatile personal computer.

Figure 19:
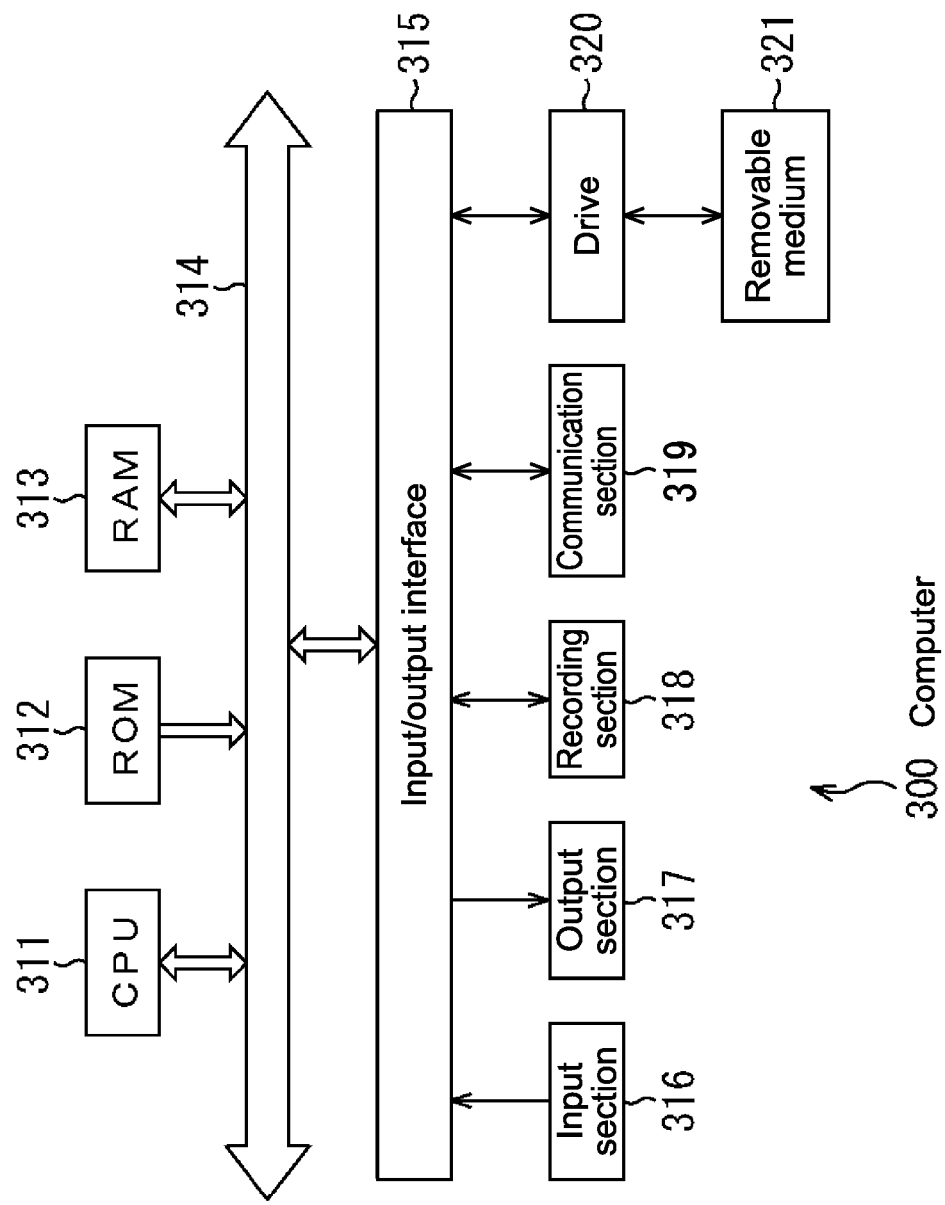
FIG. 19 is a diagram showing a structural example of a computer.

FIG. 19 is a diagram showing a structural example of hardware of a computer that executes the series of processing described above by a program.

In a computer 300, a CPU (Central Processing Unit) 311, a ROM (Read Only Memory) 312, and a RAM (Random Access Memory) 313 are mutually connected by a bus 314.

Also connected to the bus 314 is an input/output interface 315. Connected to the input/output interface 315 are an input section 316, an output section 317, a recording section 318, a communication section 319, and a drive 320.

The input section 316 is constituted of a keyboard, a mouse, a microphone, and the like. The output section 317 is constituted of a display, a speaker, and the like. The recording section 318 is constituted of a hard disk, a nonvolatile memory, and the like. The communication section 319 is constituted of a network interface and the like. The drive 320 drives a removable medium 321 such as a magnetic disk, an optical disc, a magneto optical disc, and a semiconductor memory.

In the computer 300 structured as described above, the CPU 311 loads a program stored in the recording section 318 in the RAM 313 via the input/output interface 315 and the bus 314 and executes it to carry out the series of processing described above, for example.

The program executed by the computer 300 (CPU 311) can be recorded onto the removable medium 321 as a package medium, for example, and provided. Moreover, the program can be provided via a wired or wireless transmission medium such as a local area network, the Internet, and digital satellite broadcast.

In the computer 300, by loading the removable medium 321 in the drive 320, the program can be installed in the recording section 318 via the input/output interface 315. The program can also be received by the communication section 319 via a wired or wireless transmission medium and installed in the recording section 318. Alternatively, the program can be installed in advance in the ROM 312 or the recording section 318.

It should be noted that the program to be executed by the computer 300 may be a program in which processing are carried out in time series in the order described in the specification or a program in which processing are carried out in parallel or at necessary timings when invoked, for example.

Here, the processing steps describing the program for causing the computer 300 to carry out the various types of processing do not necessarily need to be processed in time series in the order described as the flowcharts in the specification and also include processing that are carried out in parallel or individually (e.g., parallel processing or processing that uses object).

Further, the program may be processed by one computer, or may be processed dispersively by a plurality of computers. Alternatively, the program may be transferred to a remote computer to be executed.

Furthermore, in the specification, the system refers to a group of a plurality of constituent elements (apparatus, module (component), etc.), and whether all constituent elements are provided in the same casing is irrelevant. Therefore, a plurality of apparatuses that are accommodated in different casings and connected via a network and a single apparatus in which a plurality of modules are accommodated in a single casing are both referred to as system.

It should be noted that the embodiment of the present disclosure is not limited to the embodiment described above and can be variously modified without departing from the gist of the present disclosure.

For example, the present disclosure can take a cloud computing structure in which one function is shared and processed cooperatively by a plurality of apparatuses via a network.

Moreover, the steps described in the flowcharts can be assigned to and executed by a plurality of apparatuses instead of executing them by a single apparatus.

Furthermore, when a single step includes a plurality of processing, the plurality of processing included in the single step can be assigned to and executed by a plurality of apparatuses instead of executing them by a single apparatus.

It should be noted that the present disclosure may also take the following structures.

(1) An image processing apparatus, including:
a cutout frame setting section configured to set a cutout frame for partially cutting out an editing target image as an editing target;
an image editing section configured to edit, in response to an instruction from a user, an image in the cutout frame superimposed on the editing target image; and
a cutout image generation section configured to cut out the image in the cutout frame from the editing target image and generate a cutout image.

(2) The image processing apparatus according to (1) above, in which a shape of the cutout frame is restricted and deformed by a circular guide provided on the editing target image.

(3) The image processing apparatus according to (2) above, in which a center position of the circular guide matches with a center position of a predetermined target on the same plane.

(4) The image processing apparatus according to (2) or (3) above,
in which a radius of the circular guide takes a value maximized using a width of the predetermined target as a reference.

(5) The image processing apparatus according to (3) or (4) above,
in which the predetermined target is one of a screen of a display section that displays the editing target image, an image display area of an application program for editing the editing target image, and the editing target image.

(6) The image processing apparatus according to any one of (2) to (5) above,
in which the cutout frame is in internal contact with the circular guide, and the shape thereof is deformed as apexes move along the circular guide.

(7) The image processing apparatus according to (6) above,
in which the cutout frame is rectangular, and four apexes thereof move along the circular guide.

(8) The image processing apparatus according to (7) above,
in which the shape of the cutout frame becomes, when a center angle formed by two apexes that move along an arc on one of an upper side and a lower side of the circular guide and a center point is widened, laterally longer than that before the apexes move, and becomes longitudinally longer than that before the apexes move when the center angle is narrowed.

(9) The image processing apparatus according to (8) above,
in which a horizontal to vertical ratio of the cutout frame becomes a preset fixed ratio according to positions of the apexes.

(10) The image processing apparatus according to (9) above,
in which a boundary for changing the fixed ratio is preset on the circular guide, and the fixed ratio is changed when the apexes move and cross the boundary.

(11) The image processing apparatus according to (9) or (10) above,
in which the fixed ratio is a ratio corresponding to a screen aspect ratio determined based on a predetermined standard.

(12) The image processing apparatus according to (8) above,
in which a horizontal to vertical ratio of the cutout frame becomes an arbitrary ratio corresponding to positions of the apexes.

(13) The image processing apparatus according to any one of (1) to (12) above,
in which the editing target image is displayed on a touch panel, and
in which the cutout image is generated based on a touch operation on the touch panel.

(14) The image processing apparatus according to (13) above,
in which the image processing apparatus is a tablet-type electronic apparatus.

(15) The image processing apparatus according to any one of (2) to (14) above,
in which the circular guide is not displayed.

(16) An image processing method for an image processing apparatus, including:
setting, by the image processing apparatus, a cutout frame for partially cutting out an editing target image as an editing target;
editing, by the image processing apparatus, in response to an instruction from a user, an image in the cutout frame superimposed on the editing target image; and
cutting out, by the image processing apparatus, the image in the cutout frame from the editing target image and generating a cutout image.

(17) A program that causes a computer to function as:
a cutout frame setting section configured to set a cutout frame for partially cutting out an editing target image as an editing target;
an image editing section configured to edit, in response to an instruction from a user, an image in the cutout frame superimposed on the editing target image; and
a cutout image generation section configured to cut out the image in the cutout frame from the editing target image and generate a cutout image.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a central processing unit (CPU) configured to:
set a cutout frame to cut out an area of an editing target image;
edit, in response to an instruction from a user, an image in the cutout frame, wherein the cutout frame is superimposed on the editing target image; and
cut out the image in the cutout frame from the editing target image and generate a cutout image,
wherein a shape of the cutout frame is restricted by a circular guide on the editing target image, and
wherein in an event a center angle formed by two apexes, that move along an arc on one of an upper side or a lower side of the circular guide, and a center position of the circular guide is widened, the shape of the cutout frame becomes laterally longer than that before the two apexes move.

2. The image processing apparatus according to claim 1, wherein the shape of the cutout frame is deformed by the circular guide on the editing target image.

3. The image processing apparatus according to claim 1, wherein the center position of the circular guide matches with a center position of a target on a same plane.

4. The image processing apparatus according to claim 3, wherein a radius of the circular guide takes a maximum value by use of a width of the target as a reference.

5. The image processing apparatus according to claim 4, wherein the target is one of a screen that is configured to display the editing target image, an image display area of an application program to edit the editing target image, or the editing target image.

6. The image processing apparatus according to claim 1, wherein the cutout frame is in internal contact with the circular guide, and
wherein the shape of the cutout frame is deformed as the two apexes move along the circular guide.

7. The image processing apparatus according to claim 1, wherein the cutout frame is rectangular, and four apexes thereof move along the circular guide.

8. The image processing apparatus according to claim 1, wherein in an event the center angle is narrowed, the shape of the cutout frame becomes longitudinally longer than that before the two apexes move.

9. The image processing apparatus according to claim 1, wherein a horizontal to vertical ratio of the cutout frame becomes a fixed ratio based on positions of the two apexes.

10. The image processing apparatus according to claim 9, wherein a boundary to change the fixed ratio is set on the circular guide, and
wherein the fixed ratio is changed in an event the two apexes move and cross the boundary.

11. The image processing apparatus according to claim 10,
wherein the fixed ratio is a ratio that corresponds to a screen aspect ratio determined based on a standard aspect ratio.

12. The image processing apparatus according to claim 1, wherein a horizontal to vertical ratio of the cutout frame becomes an arbitrary ratio that corresponds to positions of the two apexes.

13. The image processing apparatus according to claim 1, wherein the editing target image is displayed on a touch panel, and
wherein the cutout image is generated based on a touch operation on the touch panel.

14. The image processing apparatus according to claim 1, wherein the image processing apparatus is a tablet-type electronic apparatus.

15. The image processing apparatus according to claim 1, wherein the CPU is further configured to hide the circular guide on the editing target image.

16. An image processing method, comprising:
in an image processing apparatus:
   setting a cutout frame to cut out an area of an editing target image;
   editing, in response to an instruction from a user, an image in the cutout frame, wherein the cutout frame is superimposed on the editing target image; and
   cutting out the image in the cutout frame from the editing target image and generating a cutout image,
   wherein a shape of the cutout frame is restricted by a circular guide on the editing target image, and
   wherein in an event a center angle formed by two apexes, that move along an arc on one of an upper side or a lower side of the circular guide, and a center position of the circular guide is widened, the shape of the cutout frame becomes laterally longer than that before the two apexes move.

17. A non-transitory computer-readable storage medium having stored thereon a set of computer-executable instructions for causing a computer to perform operations, comprising:
   setting a cutout frame to cut out an area of an editing target image;
   editing, in response to an instruction from a user, an image in the cutout frame, wherein the cutout frame is superimposed on the editing target image; and
   cutting out the image in the cutout frame from the editing target image and generating a cutout image,
   wherein a shape of the cutout frame is restricted by a circular guide on the editing target image, and
   wherein in an event a center angle formed by two apexes, that move along an arc on one of an upper side or a lower side of the circular guide, and a center position of the circular guide is widened, the shape of the cutout frame becomes laterally longer than that before the two apexes move.

* * * * *